(12) United States Patent
Lee et al.

(10) Patent No.: US 7,217,092 B2
(45) Date of Patent: May 15, 2007

(54) METHOD AND APPARATUS FOR REDUCING TURBINE BLADE TEMPERATURES

(75) Inventors: Ching-Pang Lee, Cincinnati, OH (US); Aspi Rustom Wadia, Loveland, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/824,283

(22) Filed: Apr. 14, 2004

(65) Prior Publication Data

US 2007/0059172 A1   Mar. 15, 2007

(51) Int. Cl.
  *F01D 5/18* (2006.01)
(52) U.S. Cl. .................................... 416/97 R
(58) Field of Classification Search .............. 416/97 R, 416/96 R, 96 A; 415/115, 116
  See application file for complete search history.

(56) References Cited

U.S. PATENT DOCUMENTS

| 4,515,526 A | 5/1985 | Levengood |
| 4,684,322 A | 8/1987 | Clifford et al. |
| 4,786,233 A | 11/1988 | Shizuya et al. |
| 5,002,460 A | 3/1991 | Lee et al. |
| 5,246,340 A * | 9/1993 | Winstanley et al. ...... 416/97 R |
| 5,484,258 A | 1/1996 | Isburgh et al. |
| 5,603,606 A | 2/1997 | Glezer et al. |
| 5,704,763 A | 1/1998 | Lee |
| 5,820,337 A * | 10/1998 | Jackson et al. ............. 415/200 |
| 6,382,913 B1 | 5/2002 | Lee et al. |
| 6,422,821 B1 | 7/2002 | Lee et al. |
| 6,602,052 B2 | 8/2003 | Liang |
| 6,609,884 B2 | 8/2003 | Harvey |
| 6,652,235 B1 | 11/2003 | Keith et al. |

\* cited by examiner

*Primary Examiner*—Edward K. Look
*Assistant Examiner*—Nathan Wiehe
(74) *Attorney, Agent, or Firm*—William Scott Andes; Armstrong Teasdale LLP

(57) ABSTRACT

An airfoil for a gas turbine engine includes a first sidewall and a second sidewall coupled together at a leading edge and a trailing edge, such that a cavity is defined therebetween. A plurality of rib walls extend at least partially between the first and second sidewalls, wherein the plurality of rib walls define at least one cooling circuit having at least three cooling chambers. At least one row of openings extend through at least one of the rib walls, wherein a first of the cooling chambers supplies cooling fluid to the cavity, and the remaining cooling chambers are coupled in flow communication with the first cooling chamber via the openings.

18 Claims, 3 Drawing Sheets

METHOD AND APPARATUS FOR REDUCING TURBINE BLADE TEMPERATURES

BACKGROUND OF THE INVENTION

This invention relates generally to gas turbine engine rotor blades and, more particularly, to methods and apparatus for reducing turbine blade temperatures.

Gas turbine engine rotor blades typically include airfoils having leading and trailing edges, a pressure side, and a suction side. The pressure and suction sides are connected at the airfoil leading and trailing edges, and span radially between the airfoil root and the tip. During operation, combustion gases impact the rotating rotor blades transferring heat into the airfoils. Over time, continued exposure to high temperature combustion gases may thermally fatigue the airfoil.

To facilitate preventing damage to the airfoils from exposure to the high temperature combustion gases, known airfoils include an internal cooling circuit which channels cooling fluid through the airfoil. Specifically, at least some known rotor blades channel compressor bleed air into a cavity defined between the sidewalls, to convectively cool the sidewalls. Moreover, at least some known cooling circuits utilize shear-jet cooling wherein a plurality of shear-jet openings channel cooling fluid along an inner surface of the sidewalls to facilitate cooling the sidewalls. Additional cooling cavities can be accomplished using impingement cooling wherein impingement inserts channel cooling fluid through impingement jet arrays against the inner surface of the airfoil's leading edge to facilitate cooling the airfoil along the leading edge. However, these circuits are inefficient as the circuits allow the cooling fluid to flow through the center of the cavity where it is ineffective in removing heat from the walls of the airfoil.

BRIEF DESCRIPTION OF THE INVENTION

In one aspect, a method is provided for fabricating a rotor blade for a gas turbine engine. The rotor blade includes an airfoil having a first sidewall and a second sidewall connected together at a leading edge and a trailing edge, such that a cavity is formed therebetween. The method includes forming a plurality of rib walls that extend at least partially between the first and second sidewalls, wherein the rib walls define at least one cooling circuit, wherein each cooling circuit includes at least three cooling chambers, wherein a first of the cooling chambers supplies cooling fluid to the airfoil cavity, and forming at least one row of openings within at least one of the rib walls extending between adjacent cooling chambers, such that the remaining cooling chambers are coupled in flow communication to the first cooling chamber via the openings.

In another aspect, an airfoil is provided for a gas turbine engine. The airfoil includes a first sidewall and a second sidewall coupled together at a leading edge and a trailing edge, such that a cavity is defined therebetween. A plurality of rib walls extend at least partially between the first and second sidewalls, wherein the plurality of rib walls define at least one cooling circuit having at least three cooling chambers. At least one row of openings extend through at least one of the rib walls, wherein a first of the cooling chambers supplies cooling fluid to the cavity, and the remaining cooling chambers are coupled in flow communication with the first cooling chamber via the openings.

In a further aspect, a gas turbine engine is provided. The gas turbine engine includes a plurality of rotor blades, each rotor blade has an airfoil that includes a leading edge, a trailing edge, a first sidewall and a second sidewall coupled together at the leading and trailing edges such that a cavity is defined therebetween, a plurality of rib walls extending at least partially between the first and second sidewalls, and at least one row of openings extending through at least one of the rib walls. The plurality of rib walls define at least one cooling circuit having at least three cooling chambers, wherein a first of the cooling chambers supplies cooling fluid to the cavity, wherein the remaining cooling chambers are coupled in flow communication with the first cooling chamber via said openings.

DETAILED DESCRIPTION OF THE INVENTION

Figure 1:
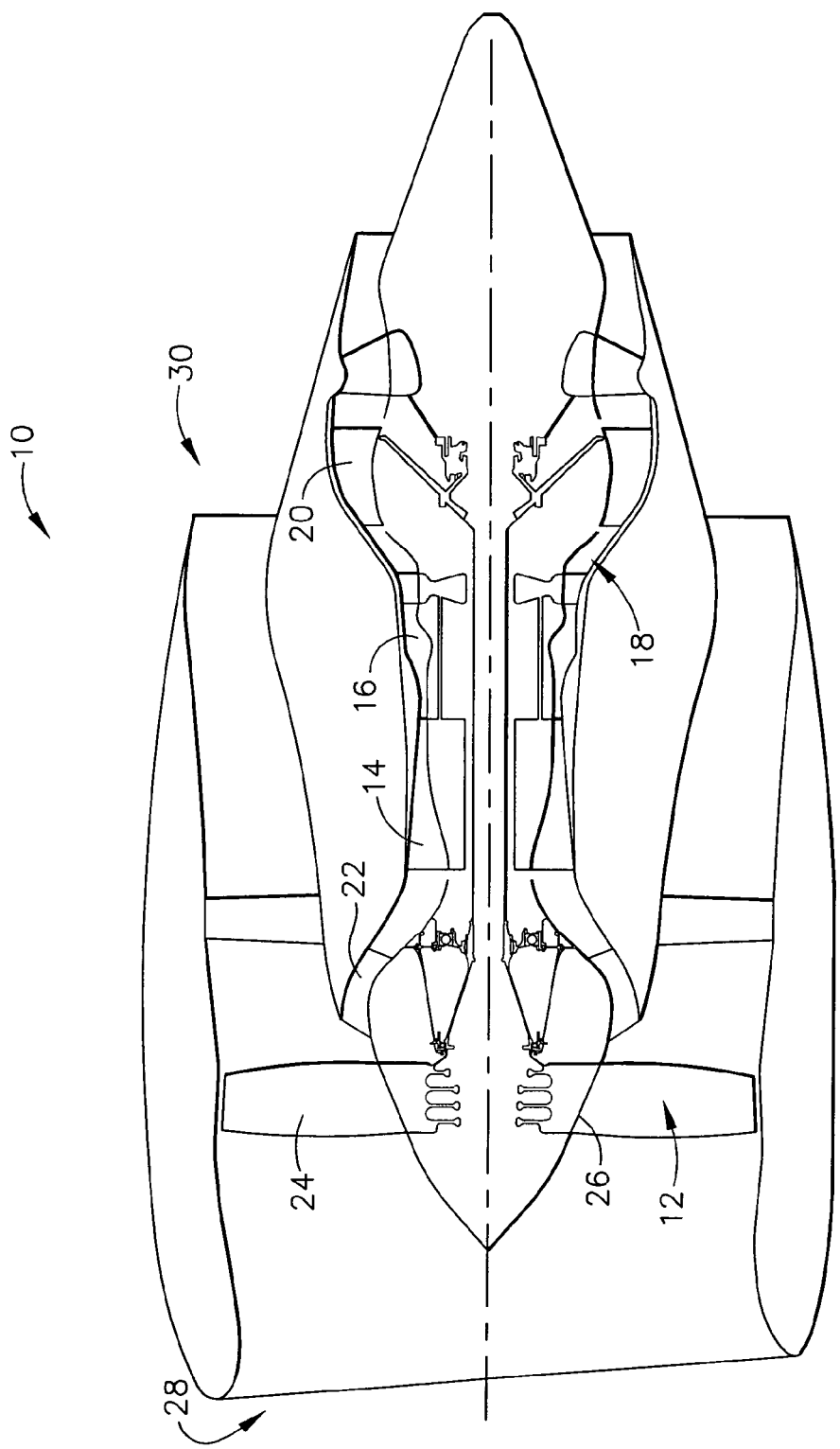
FIG. 1 is schematic illustration of an exemplary gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, engine 10 is a CT7 engine commercially available from General Electric Aircraft Engines, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
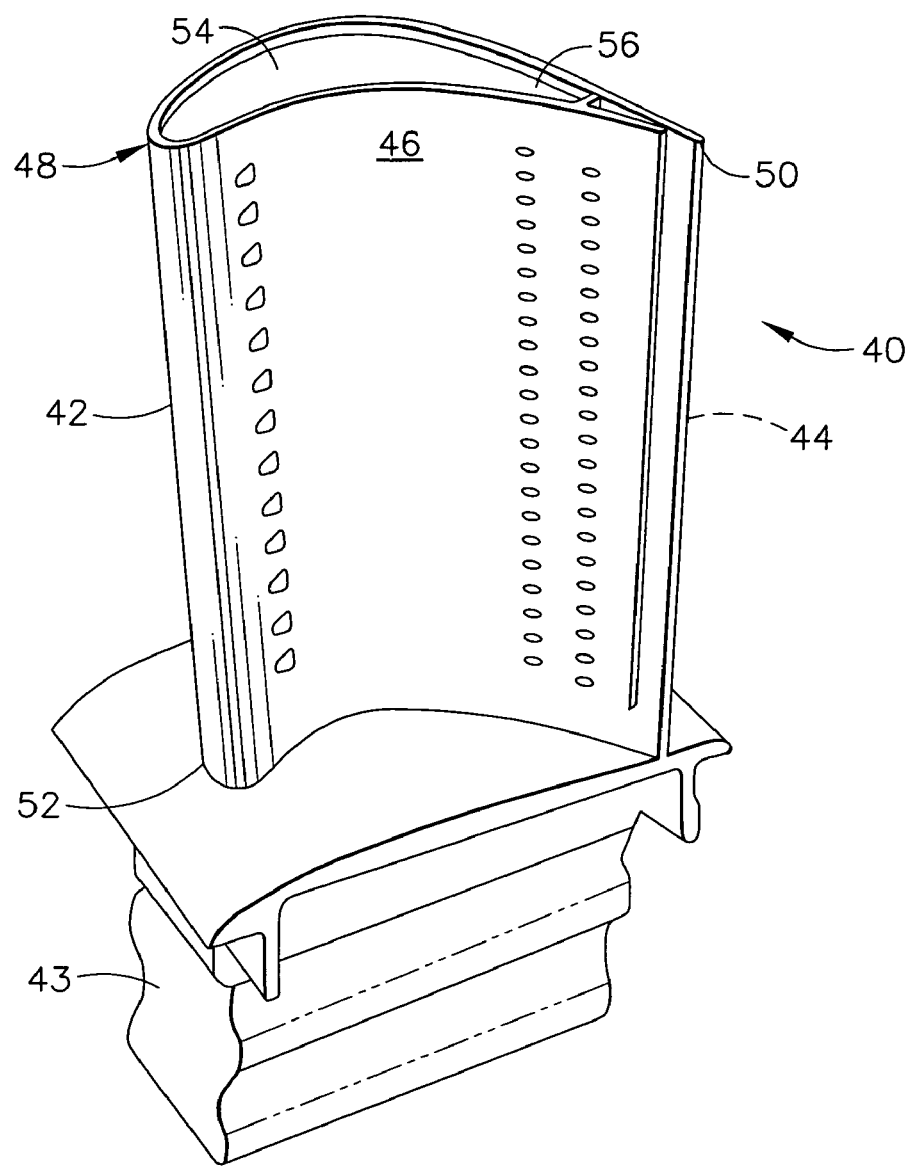
FIG. 2 is a perspective view of an exemplary rotor blade that may be used with the gas turbine engine shown in FIG. 1.
Figure 3:
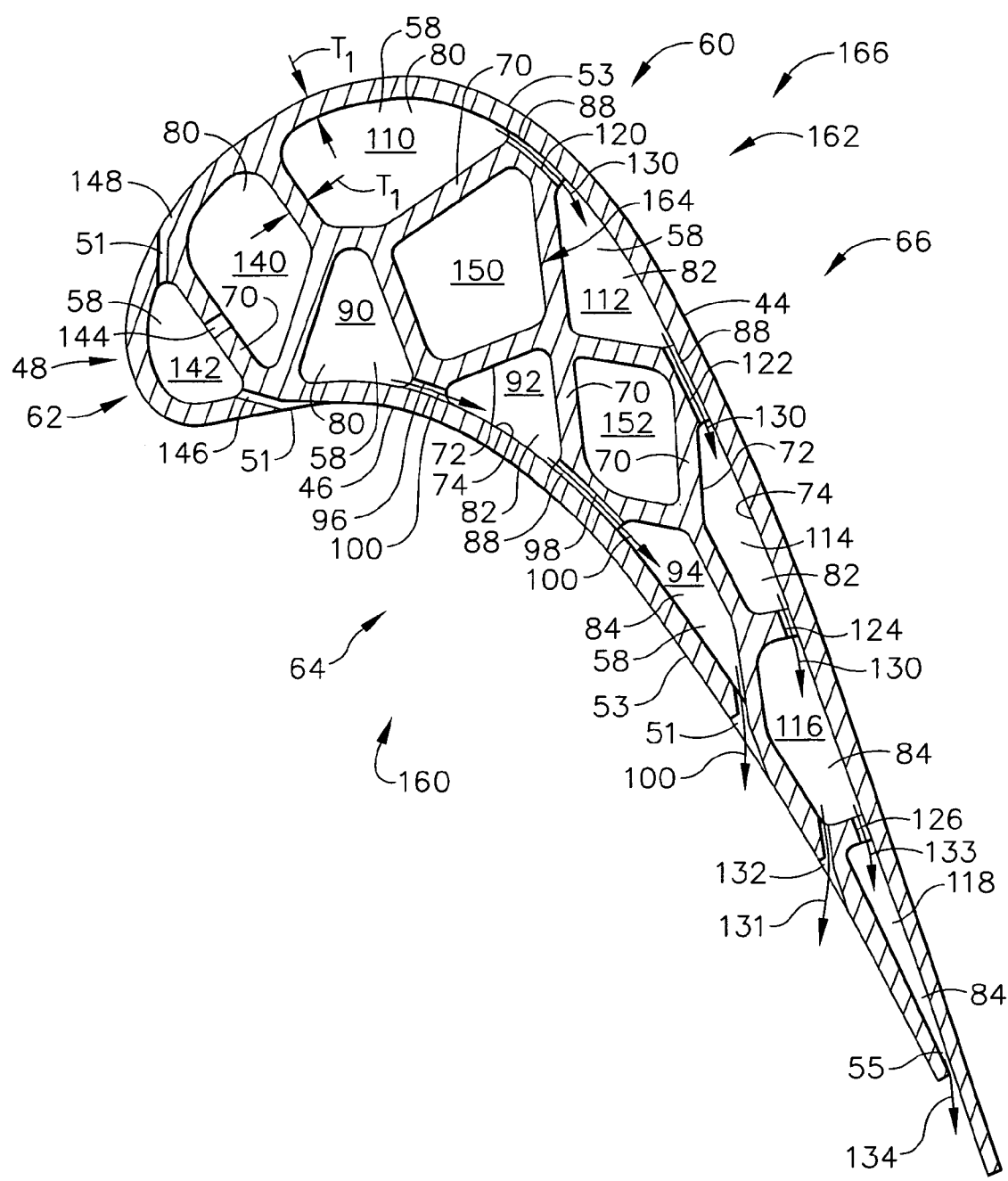
FIG. 3 is a cross-sectional view of the rotor blade shown in FIG. 2.

FIG. 2 is a perspective view of a rotor blade 40 that may be used with gas turbine engine 10 (shown in FIG. 1). FIG. 3 is a cross-sectional view of rotor blade 40. In one embodiment, a plurality of rotor blades 40 form a high pressure turbine rotor blade stage (not shown) of gas turbine engine 10. Each rotor blade 40 includes a hollow airfoil 42 and an integral dovetail 43 used for mounting airfoil 42 to a rotor disk (not shown) in a known manner.

Airfoil 42 includes a first sidewall 44 and a second sidewall 46. First sidewall 44 is convex and defines a suction side of airfoil 42, and second sidewall 46 is concave and defines a pressure side of airfoil 42. Sidewalls 44 and 46 are connected together at a leading edge 48 and at an axially-spaced trailing edge 50 of airfoil 42 that is downstream from leading edge 48. Airfoil 42 includes a plurality of film holes 51 that are spaced radially along sidewall 46 and between an airfoil tip 54 and a blade root 52 for discharging cooling fluid from airfoil 42 to facilitate cooling an outer surface 53 of airfoil 42. Airfoil 42 also includes a plurality of trailing edge slots 55 spaced radially between airfoil tip 54 and blade root 52 along trailing edge 50 for discharging cooling fluid from airfoil 42 to facilitate cooling airfoil trailing edge 50. Heat transfer enhanced by film holes 51 and trailing edge slots 55 facilitates cooling along airfoil outer surface 53.

First and second sidewalls 44 and 46, respectively, extend longitudinally from blade root 52 positioned adjacent dovetail 43 to airfoil tip 54 which defines a radially outer boundary of an internal cavity 56. Cavity 56 is defined within airfoil 42 between sidewalls 44 and 46. In the exemplary embodiment, cavity 56 is divided into a plurality of cooling chambers 58 which form cooling circuits 60 that target specific areas of airfoil 42. In the exemplary embodiment, three cooling circuits 60 are provided. Specifically, in the exemplary embodiment, cooling circuits 60 include a leading edge circuit 62 for cooling leading edge 48, a pressure side circuit 64 for cooling pressure sidewall 46, and a suction side circuit 66 for cooling suction sidewall 44. In an alternative embodiment, airfoil 42 has more or less than three cooling circuits 60.

Cavity 56 includes a plurality of rib walls 70 extending therein. Specifically, in the exemplary embodiment, rib walls 70 extend radially between airfoil tip 54 and blade root 52, and, in conjunction with airfoil sidewalls 44 and 46, define cooling chambers 58. In an alternative embodiment, rib walls 70 extend only partially between airfoil tip 54 and blade root 52. In the exemplary embodiment, airfoil sidewall 44 and/or 46 and rib walls 70 are fabricated with a substantially equal wall thickness $T_1$. Accordingly, in the exemplary embodiment, each cooling chamber 58 is bordered by at least one airfoil sidewalls 44 and/or 46, and/or by at least one rib wall 70. Specifically, cooling chambers 58 are defined by an inner surface 72 of at least one rib wall 70, and/or an inner surface 74 of at least one airfoil sidewall 44 and/or 46.

Each cooling circuit 60 includes at least one feed chamber 80, at least one transition chamber 82, and at least one ejection chamber 84. In the exemplary embodiment, chambers 80, 82, and/or 84 are separated from one another by rib walls 70, and are coupled together in flow communication by a row of openings 88, or slots, formed in a rib wall 70 extending between adjacent chambers 58. Each row of openings 88 is spaced across each rib wall 70 between blade root 52 and airfoil tip 54. Each transition chamber 82 and ejection chamber 84 extend substantially through airfoil 42 between blade root 52 and airfoil tip 54. In the exemplary embodiment, feed chamber 80 extends through blade root 52 and into rotor blade dovetail portion 43 wherein feed chamber 80 is coupled in flow communication with a feed passage (not shown) which supplies a cooling fluid, such as air, to each respective circuit 60 through feed chamber 80.

During operation, cooling fluid supplied to each cooling circuit 60 from feed chamber 80 is channeled through each transition chamber 82 and through each ejection chamber 84 prior to being discharged to the ambient environment. Accordingly, cooling circuit 60 supplies a substantially constant flow of cooling fluid to cavity 56 which is dispersed serially through chambers 80, 82, and 84 and along inner surface 74 of airfoil sidewalls 44 and 46. Cooling fluid is eventually ejected from cooling circuit via film holes 51 and/or trailing edge slots 55.

Pressure side circuit 64 utilizes a shear jet cooling process wherein a high-speed shear jet 100 directs cooling fluid across inner surface 74 of sidewall 46. In the exemplary embodiment, pressure side circuit 64 includes a pressure side feeding chamber 90, a pressure side transition chamber 92, and a pressure side ejection chamber 94. A first row of openings 96 are defined in the rib wall 70 which separates feeding chamber 90 and transition chamber 92, and a second row of openings 98 are formed in the rib wall 70 separating transition chamber 92 and ejection chamber 94. In the exemplary embodiment, openings 96 and 98 are adjacent pressure sidewall inner surface 74 such that cooling fluid discharged from openings 96 and/or 98 facilitates cooling airfoil sidewall 46, thereby reducing an operating temperature of sidewall 46.

Cooling fluid is supplied to pressure side circuit 64 via feeding chamber 90 and flows as a shear jet, indicated by arrows 100, from feeding chamber 90 through openings 96 into transition chamber 92. Specifically, cooling fluid supplied to transition chamber 92 flows along sidewall inner surface 74 to facilitate cooling of airfoil sidewall 46. Shear jet 100 is discharged from transition chamber 92 through openings 98 into ejection chamber 94, wherein the cooling fluid flows along sidewall inner surface 74 to facilitate additional cooling of airfoil sidewall 46. Shear jet 100 is then discharged from airfoil 42 through a row of film holes 51 extending through pressure sidewall 46.

In an alternative embodiment, pressure side circuit 64 includes feeding chamber 90 and ejection chamber 94, but does not include any transition chambers 92. In another alternative embodiment, pressure side circuit 64 includes a plurality of transition chambers 92 coupled together in flow communication between feeding chamber 90 and ejection chamber 94. In yet another alternative embodiment, pressure side circuit includes two or more ejection chambers 94 coupled together in flow communication, such that pressure side film holes 51 receive cooling fluid discharged from a plurality of cooling chambers 58. In a further alternative embodiment, airfoil inner surface 74 includes cooling enhancement features (not shown), such as, for example, turbulators, dimples, bumps, or a combination of these, to facilitate enhanced cooling and heat transfer.

Suction side circuit 66 utilizes a shear jet cooling process wherein a high-speed shear jet 130 directs cooling fluid across inner surface 74 of suction sidewall 44. In the exemplary embodiment, suction side circuit 66 includes a suction side feeding chamber 110, two suction side transition chambers 112 and 114, and two suction side ejection chambers 116 and 118, wherein a row of openings 120, 122, 124, and 126 are defined by the rib walls 70 which separate adjacent chambers 58, such as chambers 110, 112, 114, 116, and 118. Specifically, a first row of openings 120 extends between feeding chamber 110 and a first transition chamber 112, a second row of openings 122 extends between first transition chamber 112 and second transition chamber 114, a third row of openings 124 extends between second transition chamber 114 and first ejection chamber 116, and a forth row of openings 126 extends between first ejection chamber 116 and second ejection chamber 118. In the exemplary embodiment, openings 120, 122, 124, and 126 are positioned adjacent suction sidewall inner surface 74 such that cooling fluid discharged from openings 120, 122, 124, and 126, facilitates cooling airfoil sidewall 44.

Cooling fluid is supplied to suction side circuit 66 via feeding chamber 110 and flows as shear jet 130 from feeding chamber 110 through openings 120 into first transition chamber 112. Specifically, cooling fluid supplied to first transition chamber 112 flows along sidewall inner surface 74 to facilitate cooling airfoil sidewall 44. Shear jet 130 is discharged from transition chamber 112 through openings 122 into second transition chamber 114, wherein the cooling fluid flows along sidewall inner surface 74 to facilitate additional cooling of sidewall 44. Shear jet 130 is then discharged from second transition chamber 114 through openings 124 into first ejection chamber 116. Cooling fluid entering first ejection chamber 116 flows along inner surface 74 to facilitate cooling of airfoil sidewall 44. A portion 131 of cooling fluid is then channeled from suction side circuit 66 through a row of pressure side film holes 132 extending through pressure sidewall 46. The remaining cooling fluid flows as a shear jet 133 from first ejection chamber 116 through openings 126 into second ejection chamber 118. Cooling fluid entering second ejection chamber 118 is channeled along sidewall inner surface 74 to facilitate additional cooling of airfoil sidewall 44. Shear jet 134 is then discharged from airfoil cavity 56 through trailing edge slots 55 extending through airfoil 42 at trailing edge 50.

In an alternative embodiment, suction side circuit 66 includes feeding chamber 110 and ejection chamber 118, but does not include transition chambers 112 and 114 and ejection chamber 116. In another alternative embodiment, suction side circuit 66 includes one transition chamber 112 or 114 coupled in flow communication between feeding chamber 110 and ejection chambers 116 and 118. In a further alternative embodiment, suction side circuit 66 has one ejection chamber 116 or 118 coupled in flow communication to feed chamber 110 and transition chambers 112 and 114, such that pressure side film holes 132 only receive cooling fluid discharged from one ejection chamber 116 or 118. In another alternative embodiment, airfoil inner surface 74 includes cooling enhancement features, such as, for example, turbulators, dimples, bumps, or a combination of these, to facilitate enhanced cooling and heat transfer.

In the exemplary embodiment, airfoil 42 includes a leading edge circuit 62 having a leading edge feeding chamber 140 and a leading edge ejection chamber 142, and utilizes a conventional cold-bridge impingement cooling process. A row of openings 144, or slots, are defined by the rib wall 70 which separates feeding and ejection chambers 140 and 142, respectively. Cooling fluid is discharged from feeding chamber 140 through openings 144 into ejection chamber 142. Cooling fluid discharged from opening 144 flows towards leading edge inner surface 74. Cooling fluid is deflected towards the pressure and suction sidewalls 44 and 46, respectively, wherein the cooling fluid flows along sidewall inner surface 74 to facilitate additional cooling of airfoil sidewalls 44 and 46. A pressure side film cooling hole 146 and a suction side film cooling hole 148 extend through sidewalls 44 and 46, respectively. Cooling fluid is discharged from cavity 56 via film cooling holes 146 and 148, respectively, to facilitate further cooling of sidewalls 44 and 46.

In the exemplary embodiment, feeding chambers 90, 110 and 140 extend within cavity 56 from the feed passage (not shown) and are positioned adjacent one another. In the exemplary embodiment, feeding chambers 90, 110, and 140 are located near leading edge 48 which is the thickest section of airfoil 42. This construction provides colder, uniform temperatures in the thickest section of airfoil 42.

In the exemplary embodiment, airfoil 42 includes a first purge chamber 150 and a second purge chamber 152. Purge chambers 150 and 152 are defined by rib walls 70 and are included in airfoil cavity 56 for structural support. Purge chambers 150 and 152 are not actively cooled by cooling fluid as are the other chambers 58, but rather are cooled by a near wall impingement process. Specifically, the rib walls 70 defining purge chambers 150 and/or 152 also define cooling chambers 58, such as chambers 90, 92, 94, 110, 112, and 114. As such, when cooling fluid is transferred through cooling chambers 58, as described above, heat is transferred from rib walls 70 to the cooling fluid thereby reducing the operating temperature of rib walls 70. Accordingly, purge chambers 150 and/or 152 are cooled by the decrease in the operating temperature of rib walls 70. In an alternative embodiment, purge chambers 150 and 152 are further cooled when purge air is supplied to purge chambers 150 and 152.

In another alternative embodiment, more than two purge chambers are provided in airfoil cavity 56. In yet another alternative embodiment, less than two purge chambers are provided in airfoil cavity 56.

In the exemplary embodiment, rotor blade 40 is fabricated by a casting process using a plurality of cores formed together into a single piece core 166 and, in the exemplary embodiment, includes three separate cores 160, 162, and 164, respectively. First core 160 is defined by pressure side circuit 64 and leading edge circuit 62. Second core 162 is defined by suction side circuit 66, and third core 164 is defined by purge chambers 150 and 152. Cores 160, 162, and 164 are assembled together to form a single core 166 for the casting process. Chambers 58, 150 and 152 are sufficiently large for making ceramic cores 160, 162, and/or 164 for casting.

The above-described rotor blade is cost-effective and highly reliable. The rotor blade includes an airfoil having a number of cooling circuits which target cooling on the leading edge, pressure side and suction side of the airfoil. A number of cooling techniques are employed to cool the exterior sidewalls of the airfoil, such as impingement cooling, near-wall cooling, and shear-jet cooling. Additional cooling enhancement features can be designed into the inner sidewalls of the airfoil. As a result, cooler operating temperatures within the rotor blade facilitate extending a useful life of the rotor blades in a cost-effective and reliable manner.

While the invention has been described in terms of various specific embodiments, those skilled in the art will recognize that the invention can be practiced with modification within the spirit and scope of the claims.

What is claimed is:

1. A method of fabricating a rotor blade for a gas turbine engine, wherein the rotor blade includes an airfoil having a first sidewall and a second sidewall connected together at a leading edge and a trailing edge, such that a cavity is formed therebetween, said method comprising:

forming a plurality of rib walls that extend at least partially between the first and second sidewalls, wherein the rib walls define a pressure side cooling circuit and a suction side cooling circuit that each include at least three cooling chambers, wherein a first of the cooling chambers within each circuit supplies cooling fluid to the airfoil cavity; and forming at least one row of openings within at least one of the rib walls extending between adjacent cooling chambers of each circuit, wherein each opening is adjacent one of an inner surface of the first sidewall and an inner surface of the second sidewall, such that the remaining cooling chambers are coupled in flow communication to the first cooling chamber via the openings.

2. A method in accordance with claim 1 further comprising forming at least one feed chamber, at least one cooling chamber, and an ejection chamber coupled together in flow communication, such that during operation cooling fluid supplied from the feed chamber to the at least one cooling chamber is discharged into the ejection chamber.

3. A method in accordance with claim 1 further comprising forming a plurality of film cooling holes extending through at least one of the first sidewall and the second sidewall into at least one of the cooling chambers.

4. A method in accordance with claim 1 further comprising forming a plurality of trailing edge slots extending through at least one of the first sidewall and the second sidewall into at least one of the cooling chambers.

5. A method in accordance with claim 1 further comprising forming a leading edge circuit including a feed chamber and a cooling chamber coupled together in flow communication by a plurality of openings, such that cooling fluid discharged from the openings is directed towards the airfoil leading edge.

6. An airfoil for a gas turbine engine, said airfoil comprising:
a first sidewall and a second sidewall coupled together at a leading edge and a trailing edge, such that a cavity is defined therebetween;
a plurality of rib walls extending at least partially between said first and second sidewalls, said plurality of rib walls defining a pressure side cooling circuit and a suction side cooling circuit that each have at least three cooling chambers; and
at least one row of openings extending through at least one of said rib walls, each of said openings is adjacent one of an inner surface of said first sidewall and an inner surface of said second sidewall, wherein a first of said cooling chambers of each circuit supplies cooling fluid to said cavity, and said remaining cooling chambers within each circuit are coupled in flow communication with said first cooling chamber via said openings.

7. An airfoil in accordance with claim 6 wherein at least one of said pressure side cooling circuit and said suction side cooling circuit comprises at least one feed chamber, at least one transition chamber, and at least one ejection chamber coupled together in flow communication, such that cooling fluid supplied from said at least one feed chamber flows through said at least one transition chamber prior to being discharged into said at least one ejection chamber.

8. An airfoil in accordance with claim 6 wherein at least one of said first sidewall and said second sidewall comprises a plurality of film cooling holes extending therethrough into at least one of said cooling chambers.

9. An airfoil in accordance with claim 6 wherein at least one of said first sidewall and said second sidewall comprises a plurality of trailing edge slots extending therethrough into at least one of said cooling chambers.

10. An airfoil in accordance with claim 6 further comprising a leading edge circuit comprising a feed chamber and a cooling chamber coupled together in flow communication by a plurality of openings, such that cooling fluid discharged from said openings is directed towards said airfoil leading edge.

11. An airfoil in accordance with claim 6 wherein said plurality of rib walls define at least one purge chamber, the cooling fluid supplied to said cavity transfers heat from said rib walls thereby reducing the temperature of said at least one purge chamber.

12. A gas turbine engine comprising a plurality of rotor blades, each said rotor blade comprising an airfoil comprising a leading edge, a trailing edge, a first sidewall and a second sidewall coupled together at said leading and trailing edges such that a cavity is defined therebetween, a plurality of rib walls extending at least partially between said first and second sidewalls, said plurality of rib walls define at least one purge chamber, and at least one row of openings extending through at least one of said rib walls, wherein said plurality of rib walls define at least one cooling circuit having at least three cooling chambers, wherein a first of said cooling chambers supplies cooling fluid to said cavity, wherein said remaining cooling chambers are coupled in flow communication with said first cooling chamber via said openings, said purge chamber is not actively cooled by cooling fluid supplied to said cavity.

13. A gas turbine engine in accordance with claim 12 wherein said at least one cooling circuit comprises a pressure side cooling circuit and a suction side cooling circuit.

14. A gas turbine engine in accordance with claim 13 wherein at least one of said pressure side cooling circuit and said suction side cooling circuit comprises at least one feed chamber, at least one transition chamber, and at least one ejection chamber coupled together in flow communication, such that cooling fluid supplied from said at least one feed chamber flows through said at least one transition chamber prior to being discharged into said at least one ejection chamber.

15. A gas turbine engine in accordance with claim 12 wherein at least one of said first sidewall and said second sidewall comprises a plurality of film cooling holes extending therethrough into at least one of said cooling chambers.

16. A gas turbine engine in accordance with claim 12 wherein at least one of said first sidewall and said second sidewall comprises a plurality of trailing edge slots extending therethrough into at least one of said cooling chambers.

17. A gas turbine engine in accordance with claim 12 further comprising a leading edge circuit comprising a feed chamber and a cooling chamber coupled together in flow communication by a plurality of openings, such that cooling fluid discharged from said openings is directed towards said airfoil leading edge.

18. A gas turbine engine in accordance with claim 12 wherein the cooling fluid supplied to said cavity transfers heat from said rib walls thereby facilitating reducing the temperature of said at least one purge chamber.

* * * * *